United States Patent [19]
Ito

[11] Patent Number: 5,203,749
[45] Date of Patent: Apr. 20, 1993

[54] AUTOMATIC TRANSMISSION

[75] Inventor: Koki Ito, Higashi-Hiroshima, Japan

[73] Assignee: Mazda Motor Corporation, Hiroshima, Japan

[21] Appl. No.: 822,696

[22] Filed: Jan. 21, 1992

[30] Foreign Application Priority Data

Jan. 21, 1991 [JP] Japan .................................. 3-22796
Jan. 21, 1991 [JP] Japan .................................. 3-22797

[51] Int. Cl.$^5$ ............................................. F16H 3/62
[52] U.S. Cl. ..................................... 475/204; 475/200
[58] Field of Search ..................... 475/200, 204, 206

[56] References Cited

U.S. PATENT DOCUMENTS

| | | | |
|---|---|---|---|
| 4,331,044 | 5/1982 | Bookout et al. | 475/204 X |
| 4,592,250 | 6/1986 | Pasencia et al. | 475/204 X |
| 4,638,686 | 1/1987 | Lemieux et al. | 475/204 X |
| 4,676,123 | 6/1987 | Kubo et al. | 475/200 X |
| 4,711,138 | 12/1987 | Miura et al. | 475/200 X |
| 4,722,242 | 2/1988 | Miura et al. | 475/204 X |
| 4,756,210 | 7/1988 | Franklin et al. | 475/204 X |
| 4,938,096 | 7/1990 | Takahashi et al. | 475/206 X |

FOREIGN PATENT DOCUMENTS 62-52249 3/1987 Japan .
62-93546 4/1987 Japan .

Primary Examiner—Dirk Wright
Attorney, Agent, or Firm—Keck, Mahin & Cate

[57] ABSTRACT

An automatic transmission has an input shaft and an output shaft provided parallel to the input shaft. Above the input shaft is provided a pair of planetary gear mechanisms, an output gear supported on the transmission casing, and two input elements for inputting to the pair of planetary gear mechanisms. The input elements are spaced apart in the direction of the shafts, and the pair of planetary gear mechanisms and the output gear are provided in the space between the input elements. The planetary gear mechanisms are preferably provided respectively facing each side of the output gear with the output gear in the middle. The output gear preferably functions as a connecting member to operably connect with a rotational member of one of the planetary gear mechanisms. The transmission comprises a plurality of frictional engagement elements for selectively operating the planetary gear mechanism according to the driving condition of the vehicle. These engagement elements are preferably clutches of a novel configuration.

7 Claims, 5 Drawing Sheets

AUTOMATIC TRANSMISSION

FIELD OF THE INVENTION

The present invention relates to an automatic transmission, particularly to an automatic transmission in which the output shaft is provided parallel to the input shaft, and a plurality of planetary gear mechanisms are disposed above the shafts.

BACKGROUND OF THE INVENTION

Two-shaft type automatic transmissions for motor vehicles are known which combine a torque convertor and a shift change gear mechanism. The power transmission route of the shift change gear mechanism is switched by the selective operation of a plurality of frictional engaging elements such as clutches or brakes, etc., and constructed so that the gear stage is automatically switched in accordance with the driving condition of the vehicle. This type of automatic transmission has an input shaft for inputting engine output over the torque convertor, and an output shaft parallel to the input shaft. For example, Japanese Unexamined Published Patent Application (hereinafter referred to as Kokai) No. 62-93546 discloses an automatic transmission which has an input shaft connected to the turbine of the torque converter and an output shaft disposed parallel to the input shaft. A pair of planetary gear mechanisms, which serve as a shift change gear mechanism, is disposed between a partition wall portion and a rear wall portion of the shift gear casing over the input shaft.

In this type of transmission, in which the planetary gear mechanism is disposed over the input shaft, the mechanism is constructed with a helical gear. Because thrust load is generated following the operation of the planetary gear mechanism, thrust load is applied to the rear wall portion of the shift gear case in the direction of the shape of the helical gear. For this reason, it is necessary to increase the thickness of the rear wall portion, etc., and to improve the strength and rigidity of this portion. This tends to increase the weight and size of the shift gear mechanism.

Also, in order to obtain a plurality of gear stages by connecting the rotational elements of one of the pair of planetary gear mechanisms disposed over the input shaft, connecting members are necessary, which lead to an increase in the number of parts.

Therefore, it is an object of the present invention, in an automatic transmission having an input shaft, an output shaft parallel to the input shaft and a pair of planetary gear mechanisms disposed over the input shaft, to effectively transfer the thrust load generated by the operation of the pair of planetary gear mechanisms to the transmission casing. It is a further object of the present invention to keep the number of parts connecting with the rotational elements of each of the planetary gear mechanisms low.

In the above type of automatic transmission, hydraulic clutches are known, which serve as frictional engagement elements. Such as disclosed in Kokai 62-52249. In the disclosed clutch, in order to improve the releasability of the clutch, a centrifugal balance chamber is formed on one side of the clutch piston opposed to the hydraulic chamber.

In such known clutches, in the side portion of the clutch drum which forms the hydraulic chamber with the other side of the piston, elements for transmitting power to the clutch drum are provided, such as a one-way clutch for regulating the rotation of the clutch drum. A hydraulic clutch which serves as a power transmission device and contains a one-way clutch as above has increased axial dimensions, and thus causes the size of the entire transmission to increase.

It is, therefore yet another object of the present invention, to provide an automatic transmission in which, when a power transmission device such as a clutch and the power transmission elements for the clutch are aligned above the axis of the transmission, the power transmission elements can be arranged so as not to invite any increase in size of the transmission.

SUMMARY OF THE INVENTION

In accordance with the above objects, a first embodiment of automatic transmission of the present invention comprises an input shaft and an output shaft provided parallel to the input shaft. Above the input shaft are provided a pair of planetary gear mechanisms, an output gear supported on the transmission casing, and two input elements for inputting to the pair of planetary gear mechanisms. The input elements are spaced apart in the direction of the shafts, and the pair of planetary gear mechanisms and the output gear are provided in the space between the input elements.

In accordance with a second embodiment of the present invention, the automatic transmission is the same as in the first embodiment, except that in the space between the input elements above the input shaft, each planetary gear mechanisms is disposed on one side of the output gear, with the output gear in the middle.

In accordance with the third embodiment of the present invention, the automatic transmission has an input gear and an output gear provided parallel to the input gear. Above the input gear are provided a pair of planetary gear mechanisms, an output gear supported on the transmission casing two input elements for inputting into the pair of planetary gear mechanisms. The input elements are spaced apart in the direction of the shafts, and the pair of planetary gear mechanisms and the output shaft are disposed in the space between the input elements. Rotational elements of one of the pair of planetary gear mechanisms combine with and serve as connecting members to operably connect to the output gear.

In accordance with a fourth embodiment of the present invention, just as in the second and third embodiments, a pair of planetary gear mechanisms, an output gear supported by the transmission casing, and two input elements for inputting into the planetary gear mechanism are provided above the input shaft. The two input elements are spaced apart in the direction of the shafts. Like the second embodiment, in the space between the input elements, each planetary gear mechanism is disposed on one side of the output gear with the output gear in the middle. Rotational elements of one of the pair of planetary gear mechanisms combine with and serve as connecting members to operably connect to the output gear.

In both the first and the fourth embodiments of the present invention, the planetary gear mechanisms operated by means of the input elements are disposed at a distance above the input shaft and in the space between the input elements. Thrust load is accordingly generated. Because this thrust load is applied, by means of the planetary gear mechanisms, to the output gear which is disposed in the space between the two input elements along with the planetary gear mechanisms, and the output gear is supported on the relatively high rigidity transmission casing, the thrust load is effectively transmitted to the transmission casing.

In the second embodiment of the present invention, because, in the space between the two input elements, the planetary gear mechanisms each face one side of the output gear with the output gear in the middle, when one of the rotational elements in the planetary gear mechanisms is connected, the output gear can concurrently serve as a combining member for connecting the rotational elements. By these means, each of the rotational elements of the pair of planetary gear mechanisms can be joined without increasing the number of parts.

Furthermore, in the third and fourth embodiments, because each of the rotational elements of the pair of planetary gear mechanisms is combined by the output gear, connecting members for connecting the rotational elements are not necessary and an increase in the number of parts is prevented.

In a fifth embodiment of the present invention the transmission further comprises a frictional engagement element for selectively operating the planetary gear mechanisms. In accordance with the fifth embodiment, the frictional engagement element is made up of a clutch drum, a clutch hub provided on the inside of the clutch drum, a first spline formed on the outside surface of the clutch hub, a second spline formed on the inside surface of the clutch drum, a plurality of friction plates respectively opposed to the first and second splines, and a clutch piston which presses together the plurality of frictional plates and joins the clutch drum and clutch hub. The clutch piston has a cylindrical portion extending in the direction of its axis, a pressing portion jutting out from the cylindrical portion for pressing together the frictional plates, and a flange extending inward from a central portion of the cylindrical portion. A centrifugal balance chamber is formed on one side of the flange, and a space is formed on the other side of the flange. Within this space, the inner radial portion of the clutch drum has a bent portion, and a power transmission element for transmitting power to the clutch drum is disposed within this bent portion.

Additional objects, features and advantages of the present invention will become apparent from the Description of the Preferred Embodiments which follows, when considered together with the attached drawings.

DETAILED DESCRIPTION OF THE PREFERRED EMBODIMENTS

Figure 1:
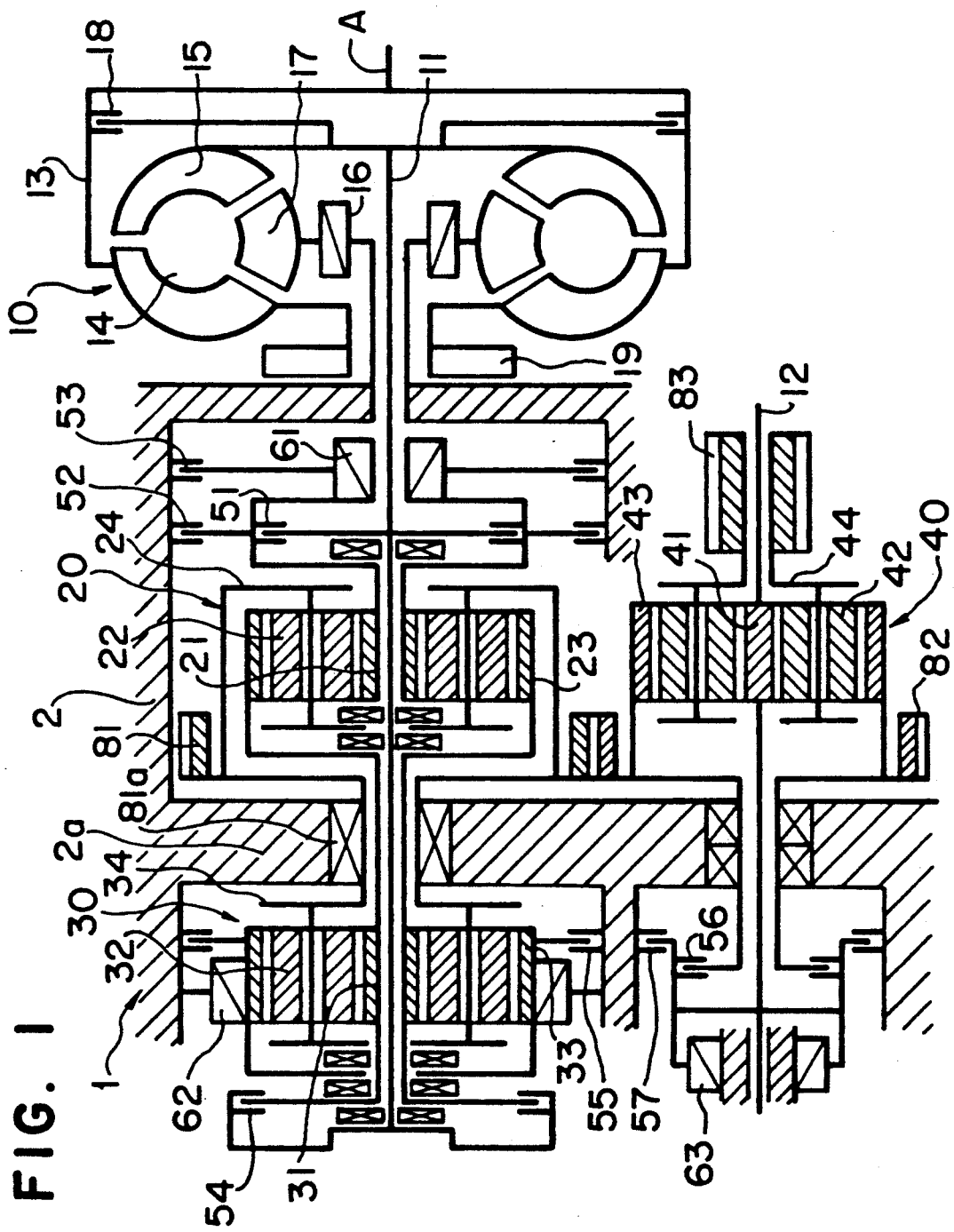
FIG. 1 diagrammatically shows the structure of an automatic transmission incorporating the present invention.

The preferred embodiments of the present invention will now be described with reference to the drawings in which like parts are represented by like reference numerals.

Figure 2:
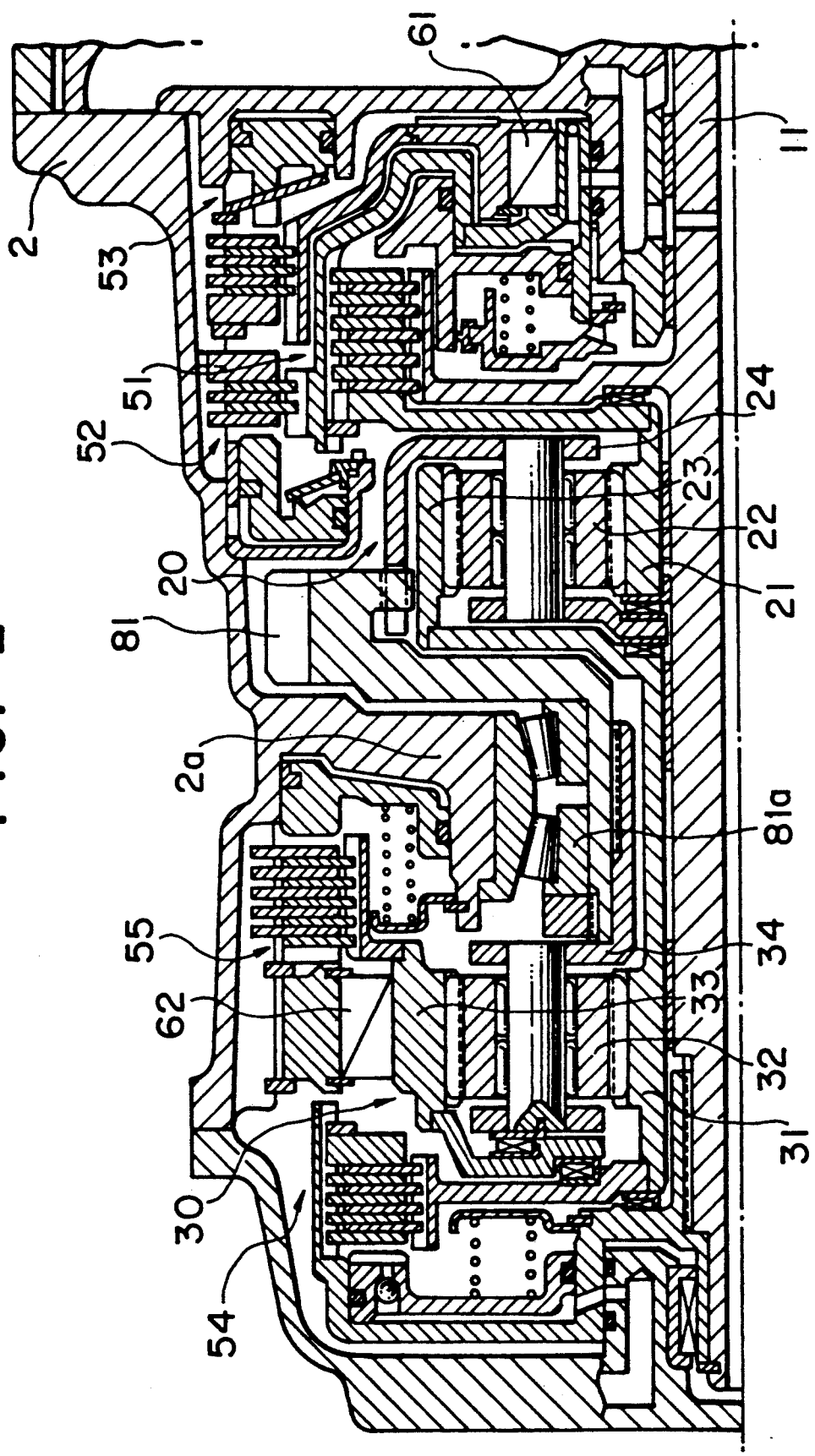
FIG. 2 shows a cross section of an automatic transmission incorporating the present invention.

Referring now to FIGS. 1 and 2, the automatic transmission of the present invention has its main structural elements disposed within a transmission casing 2. Such main elements include a torque converter 10, a turbine shaft 11 which serves as an input shaft for transmitting the output of torque converter 10, and an output shaft 12 disposed parallel to turbine shaft 11. A plurality of planetary gear mechanisms 20, 30 and 40 serve as a gear stage change device, and are disposed above input shaft 11 and output shaft 12. A plurality of frictional engagement elements 51-57 (clutches, brakes, etc.) and first second and third one-way clutches 61, 62 and 63 switch the power transmission routes of planetary gear mechanisms 20, 30 and 40. By means of the selective operation of the frictional engagement elements and one-way clutches, five forward gear stages and one reverse gear stage can be obtained.

Torque converter 10 has a pump 14 which is connected to an engine output shaft A and fixed inside a casing 13. The torque converter also has a turbine 15 opposed to pump 14, which turbine 15 is driven by means of operating oil from pump 14. A stator 17 is interposed in the space between pump 14 and turbine 15. Stator 17 increases the torque applied to the side of casing 2 by means of one-way clutch 16. Torque converter 10 also has a lock-up clutch 18 which is disposed between casing 13 and turbine 15, and which directly connects turbine 15 with engine output shaft A by means of casing 13. The rotation of turbine 15 is output to each of planetary gear mechanisms 20, 30 positioned above turbine shaft 11 by means of shaft 11.

Oil pump 19 is connected to casing 13. Oil pump 19 is driven pursuant to the rotation of casing 13.

Of the two planetary gear mechanisms 20, 30, one i.e., mechanism 20, is made up of sun gear 21 into which shaft 11 is inlaid, a plurality of pinion gears 22 which are meshed with sun gear 21, a ring gear 23 meshed with each of pinion gears 22, and a carrier 24 supporting pinion gears 22 in free rotation. The other planetary gear mechanism 30 is made up of sun gear 31 into which turbine shaft 11 is inlaid, a plurality of pinion gears 32 respectively meshed with sun gear 31, a ring gear 33 meshed with each pinion gear 32, and a carrier 34 supporting each of pinion gears 32 in free rotation. The above ring gear 23 is connected with sun gear 31 and each of carriers 24, 34 is coupled with output gear 81.

First clutch 51 is disposed in series between turbine shaft 11 and sun gear 21. First brake 52 is provided between first clutch 51 and transmission casing 2, and, in a similar manner, second brake 53, which is mediated by one-way clutch 61, is provided between first clutch 51 and transmission casing 2. Second clutch 54 is provided in series between sun gear 31 and turbine shaft 11, and third brake 55 and second one-way clutch 62 are respectively provided between ring gear 34 and transmission case 2. As is indicated in FIG. 1, planetary gear mechanism 40, which is disposed above output shaft 12, is made up of sun gear 41 which is incorporated into output shaft 12, a plurality of pinion gears 42 which are respectively meshed with sun gear 41, a ring gear 43 meshed with each of pinion gears 42, and a carrier 44 which supports each of the pinion gears in free rotation. Output shaft 12 is inlaid in input gear 82 at ring gear 43 and is meshed with output gear 81. Carrier 44 is similarly connected with drive gear 83 which is inlaid in output shaft 12. Third clutch 56 is provided between input gear 82 and output shaft 12. Third one-way clutch 63 and fourth brake 57 are respectively interposed between third clutch 56 and transmission casing 2. The rotation of input gear 82, which is meshed with output gear 81, is transmitted to drive gear 83 by means of planetary gear mechanism 40. By these means, the power transmission routes of the above planetary gear mechanisms 20, 30, and 40 are switched by the selective operation of a plurality of frictional engagement elements 51–57 and first, second and third one-way clutches 61, 62 and 63, and the power of engine output shaft A is, depending on the driving condition of the vehicle, shifted and transmitted to drive gear 83.

Table 1 shows the relationship of operational states of the frictional engagement elements 51–57 and first, second and third one-way clutches 61, 62 and 63 to the gear stage.

| Speed | Clutch 1st | Clutch 2nd | Clutch 3rd | Brake 1st | Brake 2nd | Brake 3rd | Brake 4th | One-way Clutch 1st | One-way Clutch 2nd | One-way Clutch 3rd |
|---|---|---|---|---|---|---|---|---|---|---|
| 1st |  | O |  |  |  | (O) | O |  | O | O |
| 2nd |  | O | O |  |  | (O) |  |  | O |  |
| 3rd |  | O |  | O | O |  |  | O |  | O |
| 4th | O | O | O |  | O |  | O |  |  | O |
| 5th | O | O |  |  | O |  |  |  |  |  |
| Reverse | O |  | O |  |  |  |  |  |  |  |

According to Table 1, in the first stage, second clutch 54 is engaged, third and fourth brakes 55, 57 are engaged, and second and third one-way clutches 62, 63 are in the power transmission mode. In the second stage, second clutch 54 along with third clutch 56 are engaged, only third brake 55 is engaged, and only second one-way clutch 62 is in the power transmission mode. In the third stage, third clutch 56, which was engaged in the second stage, is released, first and second and fourth brakes 52, 53, 57 are engaged, and first and third one-way clutches 61 and 63 are in the power transmission mode. In the fourth stage, first and second clutches 51, 54 are engaged, second and fourth brakes 53, 57 are engaged, and only third one-way clutch 63 is in the power transmission mode. In the fifth stage, first, second and third clutches 51, 54, 56 are engaged, only second brake 53 is engaged and all of the one-way clutches 61–63 are in idle rotation. In the reverse stage, only first and second clutches 51, 56 are engaged, all of the brakes are released, and all of the one-way clutches are in idle rotation.

In the present embodiment, output gear 81 is supported on the partition wall portion 2a of transmission casing 2 by means of the taper roller bearing 81a. Each of planetary gear mechanisms 20, 30 are respectively disposed on either side of partition wall portion 2a. Ring gear 24 and sun gear 31 in mechanisms 20, 30 are connected by means of output gear 81.

In the above construction, each of planetary gear mechanisms 20, 30 is operated by means of first and second clutches 51, 54 disposed above and spaced apart from input shaft 21. In accordance with the above operation, thrust load is generated and this thrust load is applied to output gear 81 by means of planetary gear mechanisms 20, 30. However, because output gear 81 is supported on partition wall portion 2a of the relatively high rigidity transmission casing 2 by means of taper roller bearing 81a, the thrust can thus be effectively stopped on the side of transmission casing 2.

Particularly, because output gear 81, which is in between first and second clutches 51, 54, is in the center with the pair of planetary gear mechanisms 20 and 30 on either side, and because each of carriers 24 in planetary gear mechanisms 20, 30 is connected by means of the output gear 81, and no new connecting members for connecting carriers 24, 34 must be provided for, an increase in the number of parts is prevented.

Figure 3:
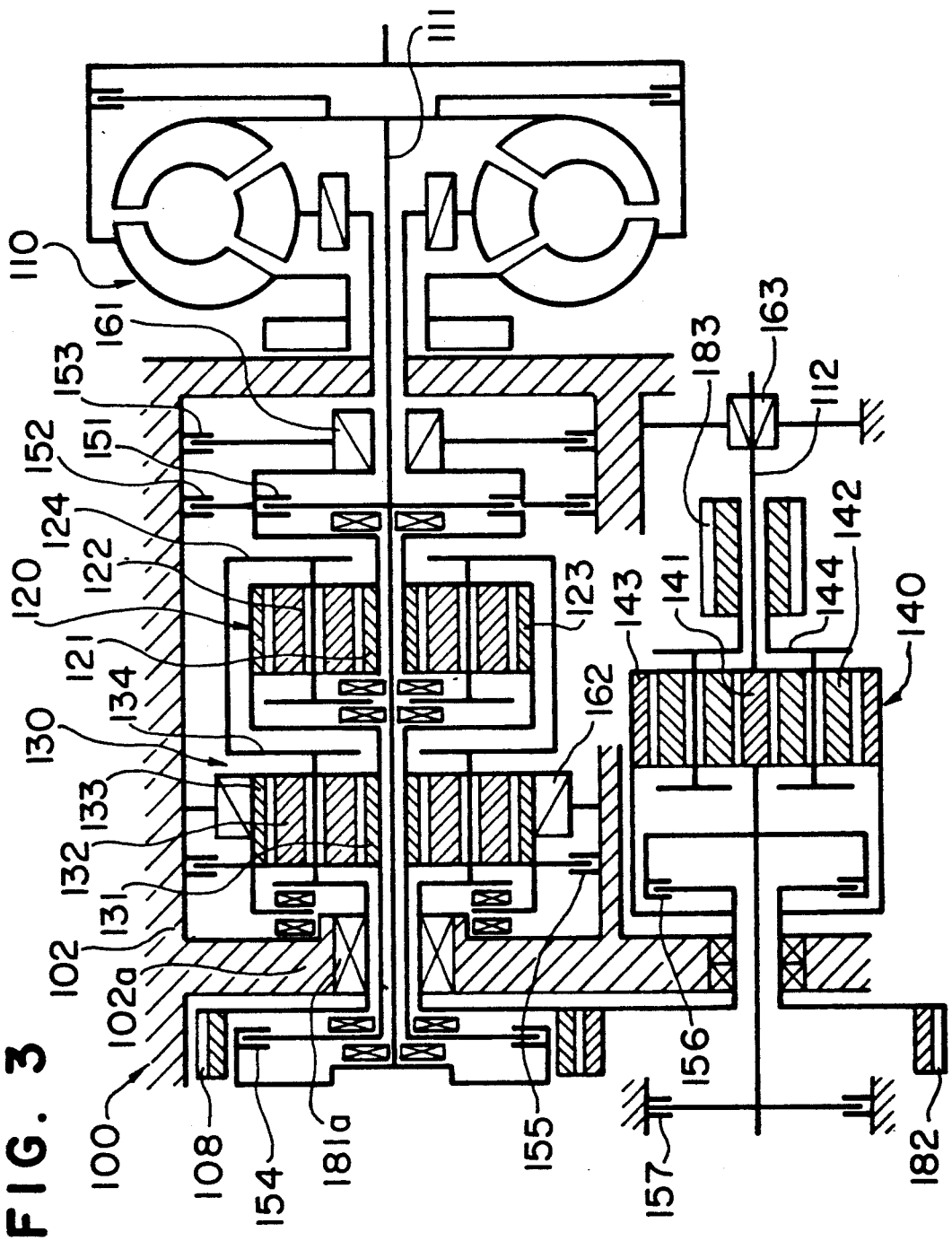
FIG. 3 shows the structure of an automatic transmission incorporating the second embodiment of the present invention.
Figure 4:
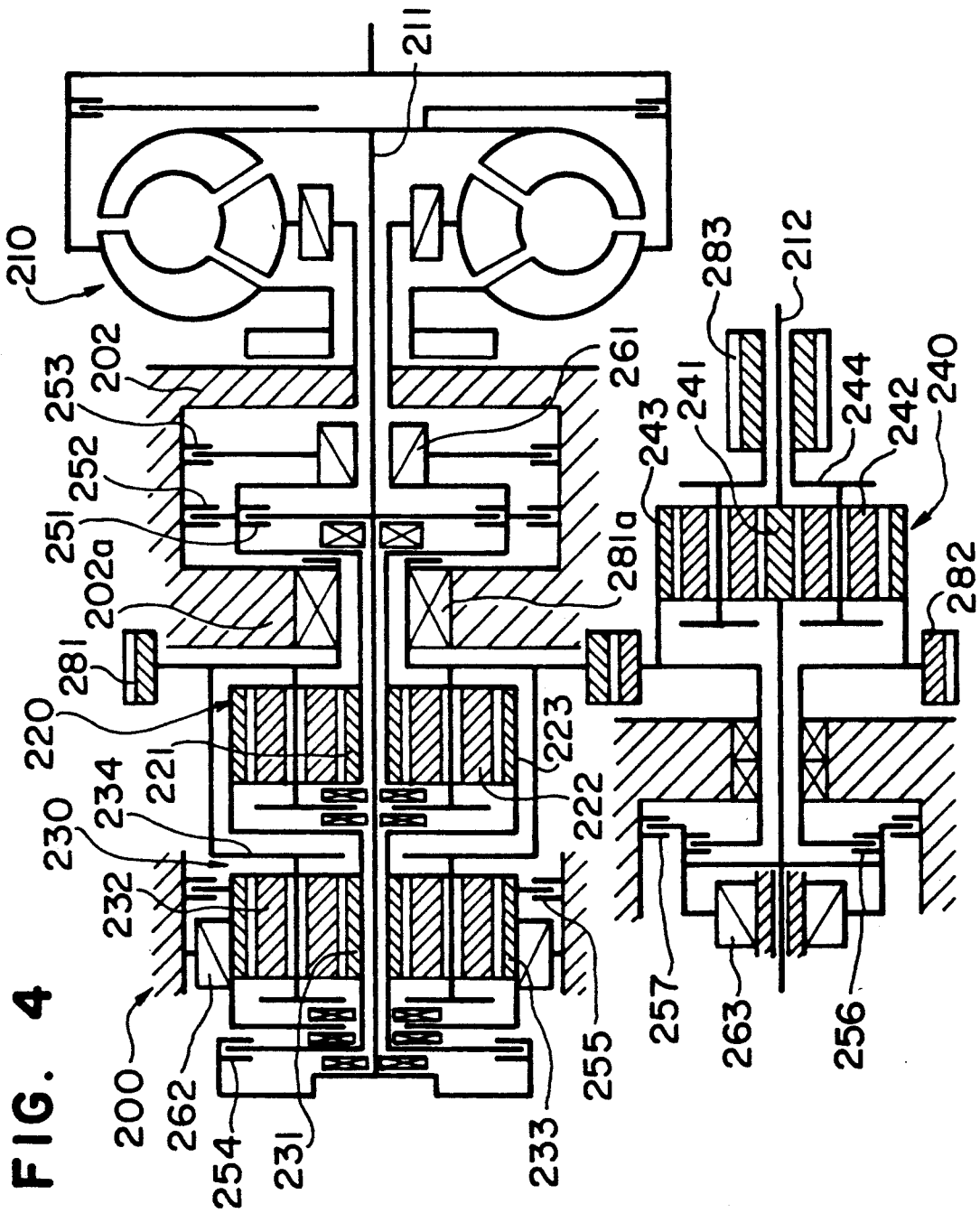
FIG. 4 shows the structure of an automatic transmission incorporating the third embodiment of the present invention.

The embodiments of FIGS. 3 and 4 will now be referred to. Automatic transmission 100 shown in FIG. 3 is made up of planetary gear mechanisms 120, 130 which are placed above a turbine shaft 111 which is connected to a torque converter 110, and a planetary gear mechanism 140 which is disposed above an output shaft 112 parallel to turbine shaft 111. Planetary gear mechanism 120 is made up of sun gear 121 in which turbine shaft 111 is inlaid, a plurality of pinion gears 122 which are respectively meshed with sun gear 121, a ring gear meshed with each of pinion gears 122, and a carrier 124 supporting each of pinion gears 122 in free rotation. The other planetary gear mechanism 130 is made up of a sun gear 131 in which turbine shaft 111 is inlaid, a plurality of pinion gears 132 which are respectively meshed with sun gear 131, a ring gear 133 meshed with each of pinion gears 132, and a carrier 134 which supports each of pinion gears 132 in free rotation. Ring gear 123 and sun gear 131 are connected and each of carriers 124, 134 is coupled by means of output gear 181.

First clutch 151 is placed in series between sun gear 121 and turbine shaft 111. First brake 152 is provided between first clutch 151 and transmission casing 102, and in a similar fashion, second brake 153 is, by means of first one-way clutch 161, provided in between first clutch 151 and transmission casing 102. Second clutch 154 is placed in series between sun gear 131 and turbine shaft 111. Third brake 155 and second one-way clutch 162 are respectively provided in between ring gear 134 and transmission casing 102.

Planetary gear mechanism 140, which is placed over output shaft 112, is made up of sun gear 141 incorporated into output shaft 112, a plurality of pinion gears 142 which are respectively meshed with sun gear 141, a ring gear 143 meshed with each of pinion gears 142, and a carrier 144 which supports each of pinion gears 142 in free rotation. Input gear 182 is meshed with output gear 181 and connected to output shaft 112 which is inserted into ring gear 143. In a similar manner, carrier 144, which moves outside output shaft 112, is connected to drive gear 182. Third clutch 156 is provided at output gear 182, and third one-way clutch 163 and fourth brake 157 are respectively interposed between output shaft 112 and transmission casing 102. The rotation of input gear 182, which is meshed with output gear 181, is transmitted to drive gear 183 by means of planetary gear mechanism 140.

According to the above structure, planetary gear mechanisms 120, 130 are operated by means of first and second clutches 151, 154 located above and spaced apart from input shaft 111. Accordingly, although thrust load is generated and this thrust load is applied to output gear 181 by means of planetary gear mechanisms 120, 130, because output gear 181 is supported by means of taper roller bearing 181a on partition wall portion 102a of the relatively high rigidity transmission casing 102, the thrust can be effectively stopped on the side of transmission casing 102.

Automatic transmission 200 shown in FIG. 4 has planetary gear mechanisms 220, 230 placed above a turbine shaft 211 connected to a torque converter 210, and a planetary gear mechanism 240 disposed above an output gear shaft 212 parallel to turbine shaft 211. Planetary gear mechanism 220 is made up of a sun gear 221 slipped over turbine shaft 211, a plurality of pinion gears 222 respectively meshed with sun gear 221, a ring gear 223 meshed with each of pinion gears 222, and a carrier 224 supporting each of the pinion gears in free rotation. The other planetary gear mechanism 230 is made up of a sun gear 231 slipped over turbine shaft 211, a plurality of pinion gears 232 respectively meshed with sun gear 231, a ring gear 233 meshed with each of pinion gears 232, and a carrier supporting each of the pinion gears in free rotation. Ring gear 223 and sun gear 231 are connected and carriers 224, 234 are respectively coupled to output gear 281.

Firth clutch 251 is placed in series between sun gear 221 and turbine shaft 211. First brake 252 is provided between first clutch 251 and transmission casing 202, and, in a similar manner, between first clutch 251 and transmission casing 202. The first one-way clutch 261 is provided opposed to second brake 253. Second clutch 254 is placed in series between sun gear 231 and turbine shaft 211, and third brake 255 and second one-way clutch 262 are respectively provided between ring gear 234 and transmission casing 202.

Planetary gear mechanism 240, disposed above output shaft 212, is made up of sun gear 241 provided incorporated with output shaft 212, a plurality of pinion gears 242 respectively meshed with sun gear 241, a ring gear meshed with each of the pinion gears 242, and a carrier 244 supporting each of pinion gears 242 in free rotation. Input gear 282, which is meshed with output gear 281, is connected with ring gear 243, into which output shaft 212 is inserted. Carrier 244, into which output shaft 212 is inserted in a similar manner, is connected with drive gear 283. Third clutch 256 is provided between input gear 282 and output shaft 212, and third one-way clutch 263 and first brake 257 are respectively interposed between third clutch 256 and transmission casing 202. Rotation of the input gear 282, which is meshed with the output gear 281, is transmitted to drive gear 283 by means of planetary gear mechanism 240.

According to the above structure, planetary gear mechanisms 230, 240 function by means of first and second clutches 251, 254 positioned above and separated from input shaft 221. Accordingly, thrust load is generated, and this thrust load is applied to output gear 281 by means of planetary gear mechanisms 230, 240. However, because output gear 281 is supported on partition wall portion 202a of the relatively high rigidity transmission casing 202, the thrust load is effectively stopped on the side of casing 202.

In the above manner, in each of the above four embodiments, planetary gear mechanisms are operated by means of two input elements which are disposed above and spaced from an input shaft. Thrust load is thus generated, and although the thrust load is applied to an output gear located between the planetary gear mechanisms and the two input elements by means of the planetary gear mechanisms, because the output gear is supported on the relatively high rigidity transmission casing, the above thrust load is effectively stopped on the side of the transmission casing.

Particularly, in the second embodiment, because the output gear between the two input elements is located in the middle with a planetary gear mechanism facing each side, when any of the rotational elements of the planetary gear mechanisms are connected, it is possible for the output gear to serve the dual purpose of a connecting member for connecting the rotational elements. As a result, it is possible to connect any of the rotational elements of the pair of planetary gear mechanisms without increasing the number of parts.

Furthermore, in the third and fourth embodiments, because the rotational elements of the pair of planetary gear mechanisms are connected by means of the output gear, it is not necessary to provide connecting members for the rotational elements and it is possible to prevent an increase in the number of parts.

Figure 5:
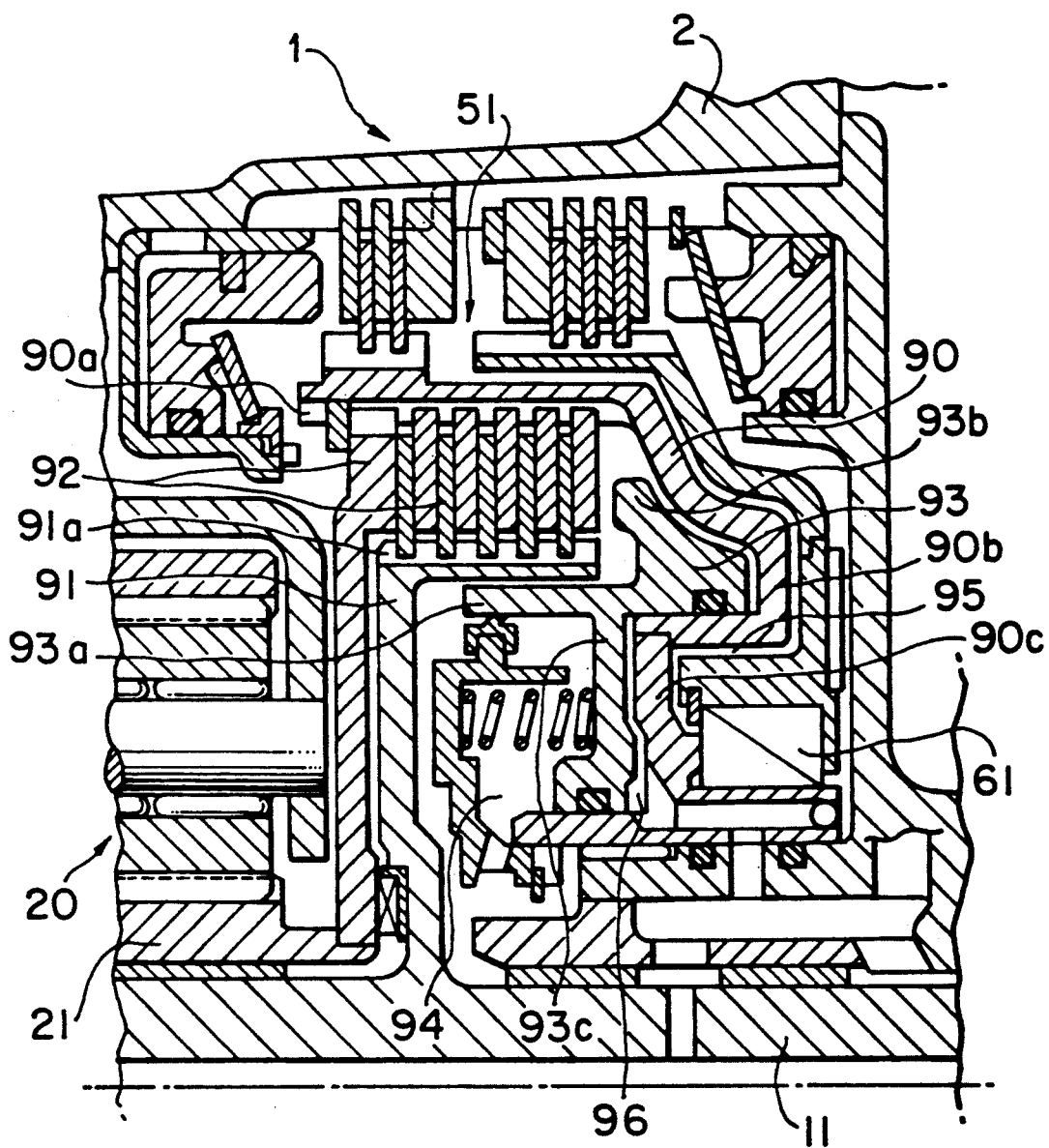
FIG. 5 shows an expanded partial cross section of a clutch according to a fifth embodiment of the invention.

Referring now to FIG. 5, in the fifth embodiment of the present invention, the frictional engagement element is clutch 51, which has an advantageous new configuration. As is shown in FIG. 5, the first clutch 51 has a clutch drum 90, a clutch hub 91 formed to the inside of the drum 90 and incorporated into the input shaft 11, a first spline 91a formed the outside surface of the clutch hub 91, a second spline 90a formed on the inside surface of the clutch drum 90, a plurality of frictional plates 92 opposed to the first and second splines, and a clutch piston 93 which presses the plurality of friction plates 92 together and joins clutch drum 90 and clutch hub 91. Clutch piston 93 has a cylindrical portion 93a extending in the axial direction, a pressing portion 93b for pressing friction plates 92 and jutting outward from the cylindrical portion 93a, and a flange 93c extending inward from a central portion of cylindrical portion 93a. A centrifugal balance chamber 94 is formed on one side of flange 93a, and a space 95 is formed on the other side. An inner radial portion of clutch drum 90 is bent in this space 95. First one-way clutch 61, a power transmission element regulating the rotation of clutch drum 90, is inserted in this bent portion 90c.

A hydraulic chamber 96 is formed between bent portion 90c of clutch drum 90 and flange portion 93c of clutch piston 93. A part of the friction plates 92 is coupled with sun gear 21 of the planetary gear mechanism 20. When first clutch 51 is engaged, the rotation of the input shaft is input into the planetary gear mechanism.

According to the above structure, a centrifugal balance chamber is provided on one side of flange portion 93c of clutch piston 93 in first clutch 51, and a space 95 is formed on the other side of flange portion 93c. First one-way clutch 61, a power transmission element for regulating the rotation of clutch drum 90, is inserted inside bent portion 90c of the clutch drum 90 in the space 95. For this reason, the axial dimensions of first one-way clutch 61 and clutch drum 90, arranged in parallel above the input shaft of the transmission 1, are shortened. The entire dimensions of first clutch 51 provided with a centrifugal balance chamber 94 and first one-way clutch as a power transmission element are reduced, and the layout is improved.

What is claimed is:

1. An automatic transmission comprising:
 a casing;
 an input shaft;
 an output shaft provided parallel to the input shaft;
 a pair of planetary gear mechanisms;
 an output gear supported on casing;
 two input elements operably connected to the pair of planetary gear mechanisms;

wherein the two input elements are spaced apart in the direction of the shaft to form a space; and wherein in the space between the two input elements, each planetary gear mechanism is disposed on one side of the output gear with the output gear in the middle.

2. An automatic transmission comprising:
a casing;
an input shaft;
an output shaft disposed parallel to the input shaft;
a pair of planetary gear mechanisms;
an output gear supported on the casing; and
two input elements operably connected to the pair of planetary gear mechanisms;
wherein the pair of planetary gear mechanisms, the output gear and the input elements are disposed above the input shaft;
wherein the two input elements are spaced apart in the direction of the shaft;
wherein the pair of planetary gear mechanisms and the output gear are disposed between the two input elements; and
wherein the output gear functions as a connecting member to operably connect with a rotational member of one of the planetary gear mechanisms.

3. An automatic transmission according to claim 1, wherein the output gear functions as a connecting member to operably connect with a rotational member of one of the planetary gear mechanisms.

4. An automatic transmission comprising:
a casing;
an input shaft;
an output shaft disposed parallel to the input shaft;
a pair of planetary gear mechanisms;
an output gear supported on the casing;
two input elements operably connected to the pair of planetary gear mechanisms; and
a frictional engagement element for selectively operating said planetary gear mechanisms, wherein the frictional engagement element comprises:
a clutch drum having an inside and an inside surface;
a clutch hub provided on the inside of the clutch drum and having an outside surface;
a first spline formed on the outside surface of the clutch hub;
a second spline formed on the inside surface of the clutch drum;
a plurality of frictional plates respectively opposed to the first and second splines; and
a clutch piston having an axis and serving to press together the plurality of frictional plates and joining the clutch drum and clutch hub, said clutch piston having a cylindrical portion extending in the direction of its axis, a pressing portion jutting out from the cylindrical portion for pressing together the frictional plates, and a flange extending inward from a central portion of the cylindrical portion;
wherein a centrifugal balance chamber is formed on one side of the flange, and a space is formed on the other side of the flange;
wherein within the space, a bent portion is provided at an inner radial portion of the clutch drum;
wherein a power transmission element for transmitting power to the clutch drum is disposed within the bent portion;
wherein the pair of planetary gear mechanisms, the output gear and the input elements are disposed above the input shaft;
wherein the two input elements are spaced apart in the direction of the shaft; and
wherein the pair of planetary gear mechanisms and the output gear are disposed between the two input elements.

5. An automatic transmission according to claim 1, further comprising a frictional engagement element for selectively operating said planetary gear mechanisms, wherein the frictional engagement element comprises:
a clutch drum having an inside and an inside surface;
a clutch hub provided on the inside of the clutch drum and having an outside surface;
a first spline formed on the outside surface of the clutch hub;
a second spline formed on the inside surface of the clutch drum;
a plurality of friction plates respectively opposed to the first and second splines; and
a clutch piston having an axis and serving to press together the plurality of frictional plates and joining the clutch drum and clutch hub, said clutch piston having a cylindrical portion extending in the direction of its axis, a pressing portion jutting out from the cylindrical portion for pressing together the frictional plates, and a flange extending inward from a central portion of the cylindrical portion;
wherein a centrifugal balance chamber is formed on one side of the flange, and a space formed on the other side of the flange;
wherein within the space, a bent portion is provided at an inner radial portion of the clutch drum; and
wherein a power transmission element for transmitting power to the clutch drum is disposed within the bent portion.

6. An automatic transmission comprising:
a casing;
an input shaft;
an output shaft disposed parallel to the input shaft;
a pair of planetary gear mechanisms;
an output gear supported on the casing;
two input elements operably connected to the pair of planetary gear mechanisms; and
a torque converter connected to one end of the input shaft;
wherein the pair of the planetary gear mechanisms is located between the torque converter and the output gear in the direction of the input shaft;
wherein the pair of planetary gear mechanisms, the output gear and the input elements are disposed above the input shaft;
wherein the two input elements are spaced apart in the direction of the shaft; and
wherein the pair of planetary gear mechanisms and the output gear are disposed between the two input elements.

7. An automatic transmission comprising:
a casing;
a torque converter disposed adjacent to said casing;
an input shaft;
an output shaft disposed parallel to the input shaft;
a pair of planetary gear mechanisms;
an output gear;
means, provided between said output gear and said torque converter, for supporting said output gear on the casing; and
two input elements operably connected to the pair of planetary gear mechanisms;

wherein the pair of planetary gear mechanisms, the output gear and the input elements are disposed above the input shaft;

wherein the two input elements are spaced apart in the direction of the shaft; and wherein the pair of planetary gear mechanisms and the output gear are disposed between the two input elements.

* * * * *